United States Patent
Eda et al.

(10) Patent No.: US 6,580,518 B2
(45) Date of Patent: Jun. 17, 2003

(54) CONFOCAL MICROSCOPE AND HEIGHT MEASUREMENT METHOD USING THE SAME

(75) Inventors: Yukio Eda, Akiruno (JP); Nahoko Hisata, Hino (JP); Terumasa Morita, Hachioji (JP); Yasuhiro Kamihara, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/146,836

(22) Filed: May 16, 2002

(65) Prior Publication Data

US 2002/0167723 A1 Nov. 14, 2002

Related U.S. Application Data

(63) Continuation of application No. PCT/JP01/07868, filed on Sep. 11, 2001.

(30) Foreign Application Priority Data

Sep. 11, 2000 (JP) ........................................ 2000-275085
Sep. 11, 2000 (JP) ........................................ 2000-275089
Sep. 11, 2000 (JP) ........................................ 2000-275090

(51) Int. Cl.[7] ........................ G01B 11/14; G02B 21/06
(52) U.S. Cl. ...................... 356/609; 359/368; 359/385; 359/388
(58) Field of Search .......................... 356/600, 601, 356/609, 614, 624; 359/380, 389, 388, 227, 363, 368–370, 385

(56) References Cited

U.S. PATENT DOCUMENTS 5,067,805 A * 11/1991 Corle et al. ............... 359/833
5,510,894 A   4/1996 Batchelder et al.
5,825,533 A * 10/1998 Yonezawa .................. 359/388
5,969,846 A * 10/1999 Kishi ........................ 359/227
6,075,646 A *  6/2000 Suzuki ...................... 359/380
6,188,514 B1 * 2/2001 Saito et al. ................. 359/381
6,226,119 B1 * 5/2001 Kurata ...................... 359/380
6,341,035 B1 * 1/2002 Miura et al. ............... 359/389
6,426,835 B1 * 7/2002 Endo et al. ................. 359/388

FOREIGN PATENT DOCUMENTS

| JP | 58 057 108 | * | 4/1983 |
| JP | 04-265918 A | | 9/1992 |
| JP | 09 065 194 | * | 3/1997 |
| JP | 09-113253 | | 5/1997 |
| JP | 09-126739 | | 5/1997 |
| JP | 09-230245 A | | 9/1997 |
| JP | 10-213751 A | | 8/1998 |

* cited by examiner

*Primary Examiner*—Frank G. Font
*Assistant Examiner*—Sang H. Nguyen
(74) *Attorney, Agent, or Firm*—Frishauf, Holtz, Goodman & Chick, P.C.

(57) ABSTRACT

A confocal microscope is provided which uses a confocal disk. The confocal microscope includes a light source, a high-NA and low-magnification objective lens which forms an image of the confocal disk obtained by irradiation with a light from the light source on a sample, and a first image formation lens system disposed between the confocal disk and the objective lens. A first image formation lens driving mechanism is provided for moving the first image formation lens system in a light axis direction and adjusting a focal point position of the objective lens with respect to the sample, and a second image formation lens system is provided which forms a sectioning image formed on the confocal disk into an image by photoelectric conversion.

12 Claims, 9 Drawing Sheets

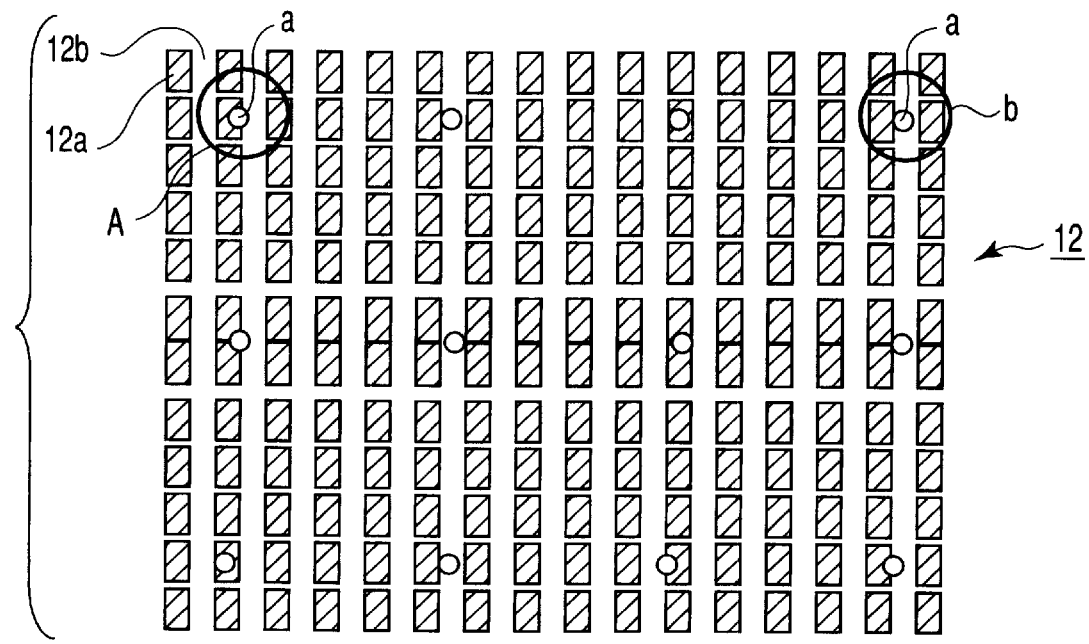
F I G. 6A
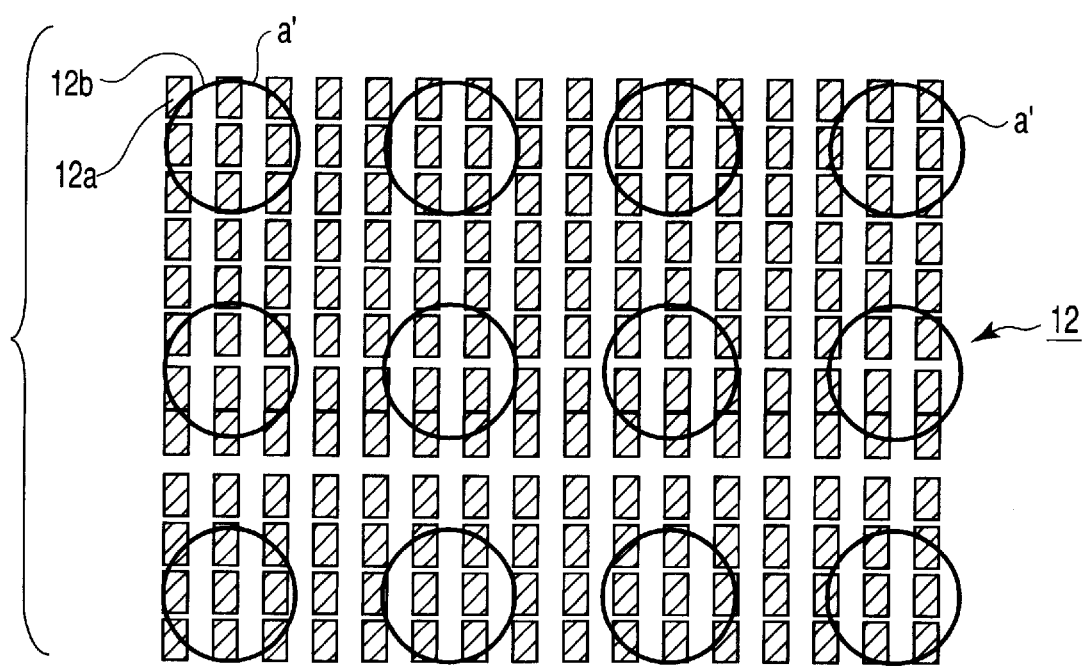
F I G. 6B

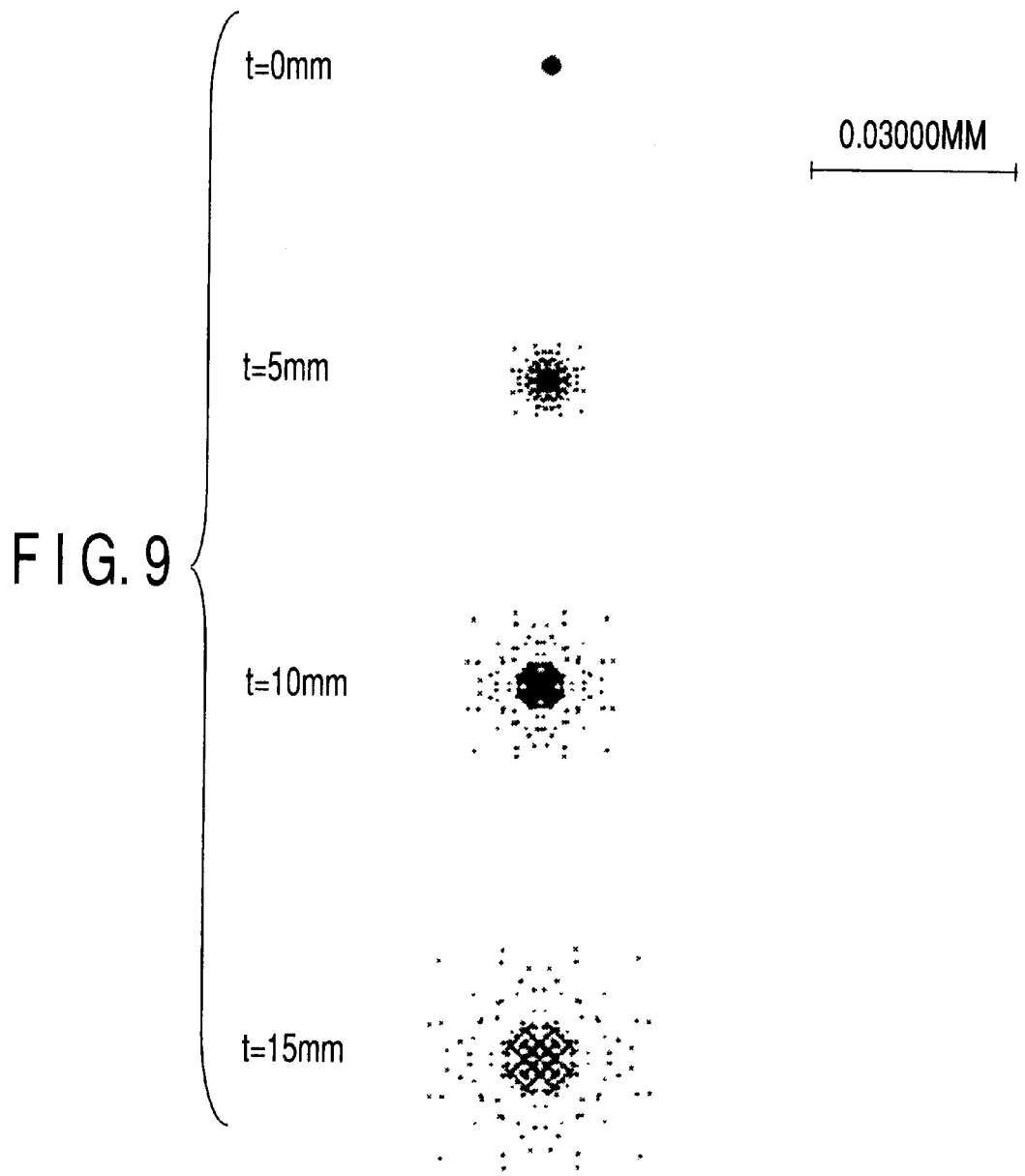

US 6,580,518 B2

CONFOCAL MICROSCOPE AND HEIGHT MEASUREMENT METHOD USING THE SAME

CROSS-REFERENCE TO RELATED APPLICATIONS

This is a Continuation Application of PCT Application No. PCT/JP01/07868, filed Sep. 11, 2001, which was not published under PCT Article 21(2) in English.

This application is based upon and claims the benefit of priority from the prior Japanese Patent Applications No. 2000-275085, filed Sep. 11, 2000, No. 2000-275089, filed Sep. 11, 2000; and No. 2000-275090, filed Sep. 11, 2000, the entire contents of all of which are incorporated herein by reference.

BACKGROUND OF THE INVENTION

1. Field of the Invention

The present invention relates to a confocal microscope using a confocal disk to obtain a sectioning image and a height measurement method using the confocal microscope.

2. Description of the Related Art

In recent years, with high integration of LSI, the number of electrodes of an LSI chip has increased, a packaging density has also increased, and a bump electrode has been used as the electrode of the LSI chip from such background.

A so-called flip chip connection is performed in which the LSI chip with such bump formed therein is laid upside down in contact with a substrate, and a bump is connected to an electrode on the substrate.

In this case, it is naturally important to accurately connect the electrode on the substrate to the bump, and it is therefore necessary to accurately form the shape and height of the bump.

As a solution, an optical height measurement apparatus in which the bump is used as a measurement object to optically measure the height of the bump has been proposed (see Jpn. Pat. Appln. KOKAI Publication Nos. 9-113253, and 9-126739). A laser scanning system or a disk system (Nipkow disk) is known as a confocal optical system of the optical height measurement apparatus, and either system has a function of converting the distribution of a height direction (light axis direction, that is, Z-axis direction) to a detected light intensity.

By this confocal optical system, a plurality of slice images are obtained for each movement position of the Z-axis direction of a sample, an IZ peak position is estimated from the maximum luminance of respective pixels of these slice images, and height information of the sample is obtained.

Additionally, when the focal point position of the Z-axis direction of the sample is moved in order to obtain the plurality of slice images, it is general to move a sample stage or an objective lens with the sample laid thereon in the Z-axis direction.

According to a sample stage movement system for moving the sample stage in the Z-axis direction, for example, when the bump height of the LSI chip formed as the sample on a large-sized 8-inches wafer is measured, the sample stage for vertically moving the 8-inch wafer with a high precision is required, and a very large-scale mechanism results. Therefore, a conventional apparatus becomes very expensive. Additionally, since the conventional apparatus also has a large mass, it is difficult to control vertical movement in a high speed, movement precision of a focal point is deteriorated, and movement also takes time. In an objective lens movement system in which the objective lens is moved in the Z-axis direction, to realize high-speed inspection in measuring the bump height of the LSI chip, the objective lens having a low magnification is used to obtain a optical system having a broad field of view, for example, having an optical system total magnification of about one time. Since this low-magnification objective lens has a large size and mass, it is difficult to control the vertical movement in the high speed. Even in this case, the movement precision of the focal point is deteriorated, and additionally the movement takes much time.

To realize the high speed of inspection, it is effective to use the low-magnification objective lens with which a large area can be observed at once and to raise a scanning speed of a two-dimensional direction. In general, a sectioning effect is valid with a larger NA of the objective lens, but the objective lens having a large NA usually has a high magnification and narrow field of view. That is, the high speed of the inspection is contradictory to the sectioning effect of a light axis direction. Therefore, in general, a high-speed inspection is performed by a low-magnification objective lens. Thereafter, when some defective portions are to be enlarged and observed, the objective lens is changed and adapted to indicate a high magnification. With the change, it is necessary to replace a rotary disk with another rotary disk in which a pinhole with a diameter corresponding to the magnification of the objective lens is formed.

However, the mechanism in which the objective lens and rotary disk are replaced in order to change the magnification has a remarkably large scale, and has a large-sized and complicated constitution. When the objective lens and rotary disk are replaced, the speed cannot be raised because of the size of the mechanism, and much changeover time is required.

On the other hand, to realize the high-speed inspection, it is proposed to use a special objective lens having large NA and low magnification, in which a broad view of field is secured at a certain degree of low magnification, and a high contrast can be realized by the sectioning effect. However, the objective lens is effective in measuring the height at a high speed, but a pixel resolution in a plane direction crossing at right angles to a light axis is not high. Therefore, in order to perform the enlargement/inspection of the defective portion, it is still necessary to replace the objective lens with the objective lens having a high magnification. Therefore, a plurality of special and expensive objective lenses having different magnifications are required, and this is economically disadvantageous.

There is also proposed a method of disposing variable magnification optical systems before and after the rotary disk, and replacing the objective lens simultaneously with varying of the magnification, so that it is unnecessary to replace the rotary disk and it is possible to prevent the sectioning effect from being deteriorated (see Jpn. Pat. Appln. KOKAI Publication No. 9-230245). Although this method is very effective, when the usual objective lens is used to perform observation with various magnifications, but it is necessary to replace the objective lens in accordance with the magnification depending on an object to be observed. Therefore, the replacement mechanism of the objective lens is large-sized, requires much time for replacement, and becomes expensive.

There is disclosed a technique of using I-Z characteristics (characteristics that a light intensity I is largest with a sample in a focal point position and the light intensity I decreases farther from the focal point position), disposing a rotary plate having a plurality of parallel plane glass plates mounted in the rear of the objective lens, and rotating this rotary plate at a high speed to move the focal point position and a relative position of the sample in Z-direction at a high speed (see Jpn. Pat. Appln. KOKAI Publication No. 9-126739). In this technique, the focal point position is discretely moved in accordance with the thickness of the parallel plane glass plate so that a slice image is obtained. In this case, the number of slice images is the same as that of parallel plane plates. A measurement range along Z direction is determined by the thickness of the thickest and thinnest parallel plane plates, and a sampling interval of the Z direction can be set to be fine with a larger number of parallel plane plates. In this manner, from the I-Z characteristics determined by a plurality of discrete slice images and the NA of the objective lens of the confocal optical system, an interpolation processing is performed in the Z direction, the focal point position of each pixel is estimated, and the speed of the height measurement of the sample can be raised.

The use of the confocal optical system is effective, when the bump becomes large to a certain degree. However, with a smaller bump, a problem occurs that much measurement time is required. That is, with an advance in miniaturization of the bump, for the CCD for use as a photodetector, it is naturally necessary to reduce a pixel size for image pick-up. Therefore, when the total magnification of the sample and CCD is the same, it is necessary to use the CCD having a much smaller pixel size. In this case, since an expensive CCD camera having a large number of pixels is used, and the image has an increased number of pixels, much time is required for a data processing. When the CCD having the same pixel size is used, the total magnification needs to be raised so as to reduce an actual field of view (range able to be imaged by the CCD). In this case, since the actual field of view is reduced, a scanning time naturally increases.

On the other hand, with the use of a device having a two-dimensional arrangement in which a train of regularly arranged pinholes is disposed in one plate, when the bump is miniaturized, a high density (a reduced pitch between the pinholes) is required for a pinhole pattern having the two-dimensional arrangement. Furthermore, since the device having the two-dimensional arrangement and the CCD camera are arranged in an optically conjugate position, it is difficult to position/adjust the respective pixels of the CCD camera and the device having the two-dimensional arrangement. Additionally, when the pitch between the pinholes is reduced, a light deviating from the focal point position (the light out of focus) enters via the adjacent pinhole, and therefore the sectioning effect drops.

BRIEF SUMMARY OF THE INVENTION

An object of the present invention is to provide a confocal microscope in which a focal point can be moved at a high precision and speed, and a magnification of a sectioning image having a low magnification can easily be varied. Another object of the present invention is to provide a height measurement method using a confocal microscope with which a high-precision height measurement can be performed in a short period of time.

According to the present invention, there is provided a confocal microscope in which a sample is irradiated with an irradiation light through a confocal disk to obtain a sectioning effect, and the light from the sample is formed into an image in photoelectric conversion means through the confocal disk, the microscope comprising: an objective image formation optical system including an image formation lens to form the image of the confocal disk on the sample and an objective lens having a low magnification; and image formation lens driving means for moving the image formation lens in a light axis direction.

According to the confocal microscope of the present invention, when the image formation lens is moved, the movement precision of a focal point can rapidly be enhanced.

Since the image formation lens can be small-sized and lightweight, movement control is enabled at a high speed, and a time for moving the focal point can remarkably be shortened.

According to the present invention, there is provided another confocal microscope in which a sample is irradiated with an irradiation light through a confocal disk to obtain a sectioning effect, and the light from the sample is formed into an image in photoelectric conversion means through the confocal disk, the microscope comprising: a first image formation optical system which forms the image of the confocal disk on the sample through an objective lens having a low magnification, and which forms the light from the sample into an image on the confocal disk; and a second image formation optical system which forms a sectioning image by the first image formation optical system with respect to the photoelectric conversion means with a varied image formation magnification.

When a variable magnification optical system is set to a low magnification in a high-speed inspection and to a high magnification in enlargement/inspection of a defective portion, a high-speed broad range inspection and enlargement/inspection of the defective portion can easily be performed.

According to the present invention, there is provided a height measurement method in a confocal hap microscope in which a sample is irradiated with an irradiation light through a confocal disk to obtain a sectioning effect, and the light from the sample is formed into an image in photoelectric conversion means through the confocal disk, the microscope comprising: a first image formation optical system including an image formation lens which forms the sectioning image obtained through the confocal disk on the sample and an objective lens having a low magnification; a second image formation optical system which forms the sectioning image by the first image formation optical system on the photoelectric conversion means; and image formation lens driving means for moving the image formation lens in a light axis direction, the measurement method comprising: moving the image formation lens in a light axis direction; obtaining an IZ peak position from luminance information of pixels of a plurality of sectioning images formed by the photoelectric conversion means; and obtaining height information of the sample. According to the height measurement method of the present invention, a height in a broad range is measured at once, the speed of focal point movement can be raised, and precision and measurement range of the height measurement can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 6A and 6B are explanatory views of a bump vertex image projected onto a CCD of the third embodiment;

FIG. 9 is an explanatory view of the first modification example of the gradation optical system for use in the third embodiment.

DETAILED DESCRIPTION OF THE INVENTION

Figure 1:
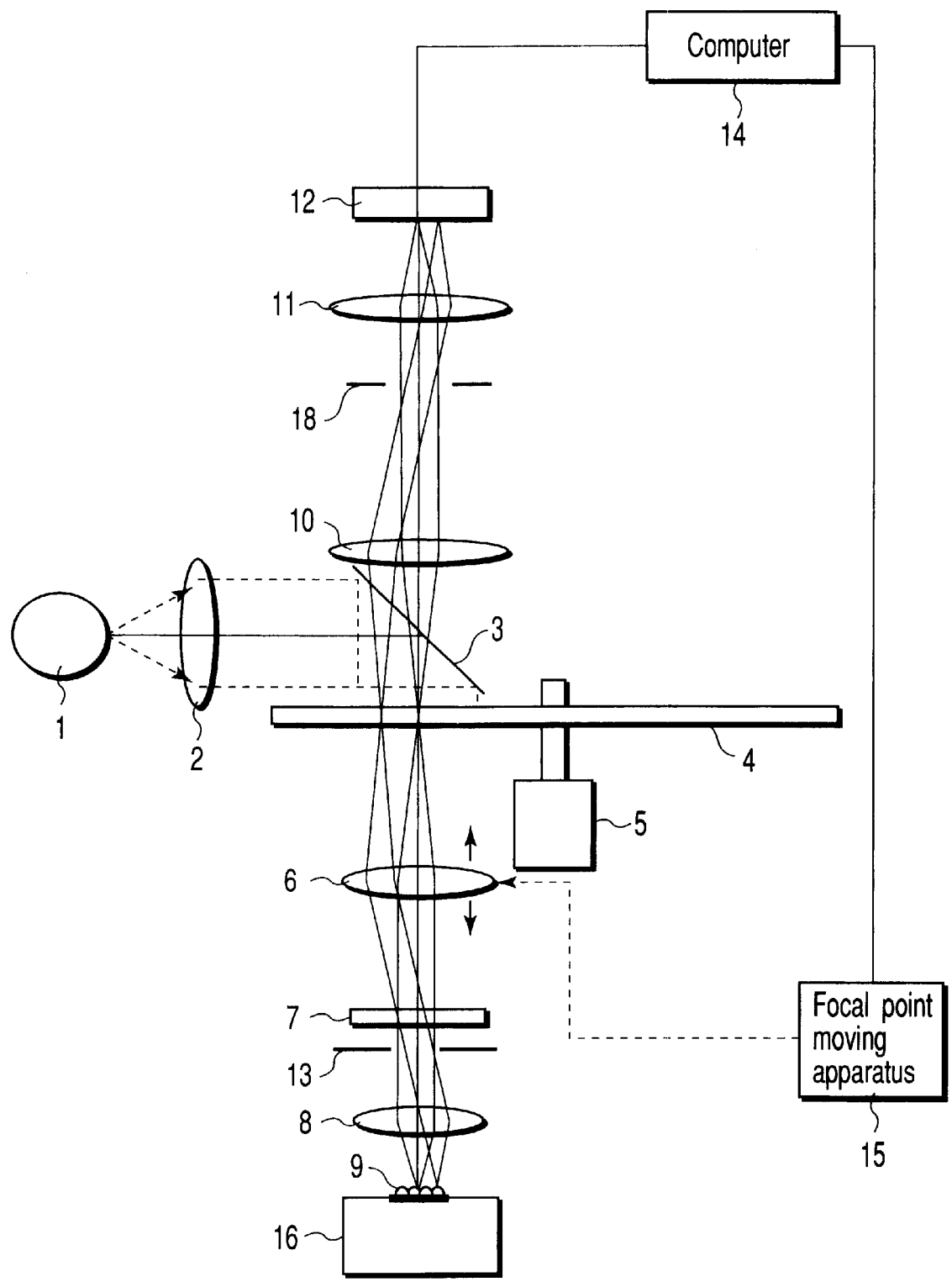
FIG. 1 is a diagram showing a schematic constitution of a confocal microscope according to a first embodiment of the present invention.

Embodiments of the present invention will be described hereinafter with reference to the drawings. FIG. 1 shows a schematic constitution of a confocal microscope according to a first embodiment of the present invention.

In FIG. 1, a lens 2 forming a lighting optical system together with a light source 1, and a polarized beam splitter (PBS) 3 are arranged on a light path of a light emitted from the light source 1 such as a halogen light source and mercury light source. On a reflected light path of the PBS 3, a confocal disk 4 such as Nipkow disk constituting a first image formation optical system, which has a sectioning effect, an image formation lens 6, a ¼ wavelength plate 7, an aperture stop 13, and a sample 9 to be observed via an objective lens 8 are arranged. In this case, an objective lens for use as the objective lens 8 can secure a broad field of view with a large NA and low magnification of five times or less (including one time or less) in order to realize a high-speed inspection. The confocal disk 4, objective lens 8, and image formation lens 6 are arranged substantially in a telecentric system. On a transmitted light path of the PBS 3 of the reflected light from the sample 9, a lens 10 constituting a second image formation optical system disposed in series with the first image formation optical system, an aperture stop 18, and a CCD camera 12 via a lens 11 are arranged.

The Nipkow disk used as the confocal disk 4 has a circular plate shape, is connected to a shaft of a motor 5, and is rotated at a constant rotation speed by the motor 5. Additionally, the confocal disk 4 may be any disk as long as a sectioning effect is generated, and a known disk, and the like can be used. A disk disclosed in Jpn. Pat. Appln. No. 2000-060578 is also usable in which a linearly formed transmission pattern and shielding pattern are alternately formed. The confocal disk 4 is not limited to the circular plate shaped disk, and may be a liquid crystal shutter. Furthermore, the sample 9 includes a semispherical bump formed on an LSI chip, and is laid on a sample stage 16.

Additionally, the second image formation optical system images a sample image (sectioning image) formed on the confocal disk 4 by the first image formation optical system (confocal optical system) and subjected to the sectioning effect onto the CCD camera 12.

The CCD camera 12 is connected to a computer 14, and start and end of imaging, transfer of an imaged image, and the like are controlled according to an instruction from the computer 14. The computer 14 takes, calculates and processes image data imaged by the CCD camera 12, displays the data on a monitor (not shown), and outputs an driving command to a focal point moving apparatus 15.

The focal point moving apparatus 15 moves the image formation lens 6 along the light axis direction by the driving command from the computer 14. When the image formation lens 6 is moved along the light axis direction, the image of the confocal disk 4 is formed in an optional height position on the sample 9. Here, when the bump height of the LSI chip is measured, the optical system having a low magnification is used in obtaining an optical system having a broad field of view in order to realize the high-speed inspection. For example, assuming that a lateral magnification of the first image formation optical system including the objective lens 8 is three times, a longitudinal magnification (=square of the lateral magnification) is $3^2=9$ times. Therefore, when the image formation lens 6 is moved by 9 $\mu$m, the image of the confocal disk 4 moves by 1 $\mu$m on the sample 9 surface, and, as a result, a focal point surface moves in the light axis direction by 1 $\mu$m.

Additionally, a general confocal optical system is used with a high magnification in many cases. Therefore, for example, when the first image formation optical system has a lateral magnification of about 100 times, the longitudinal magnification is $100^2=10000$ times. When the above-described image formation lens moving system is used in the high-magnification optical system, and even when the image formation lens is moved by 10000 $\mu$m, that is, 10 mm, the focal point surface is slightly moved by about 1 $\mu$m, and this is not practical. Therefore, the lateral magnification of the first image formation optical system is preferably 5 times or less, and can practically be used up to about 10 times.

In the above-described constitution, the light emitted from the light source 1 is formed into a parallel light through the lens 2, reflected by the PBS 3, and is incident upon the confocal disk 4, which rotates at a constant speed. The image passed through the pinhole of the confocal disk 4 is passed through the image formation lens 6, formed into a circular polarized light in the ¼ wavelength plate 7, passed through the aperture stop 13, and projected onto the sample 9 by the objective lens 8. The light reflected from the sample 9 is directed in a polarization direction crossing at right angles to an incidence direction again in the ¼ wavelength plate 7 via the objective lens 8 and aperture stop 13, and projected onto the confocal disk 4 by the image formation lens 6. A focused portion of the sample image projected onto the confocal disk 4 is passed through the pinhole, further transmitted through the PBS 3, and imaged by the CCD camera 12 via the lens 10, aperture stop 18, and lens 11. The confocal image imaged by the CCD camera 12 is taken into the computer 14.

Here, in FIG. 1, the light passed through two of the plurality of pinholes on the confocal disk 4 is noted and shown for simplicity. The confocal disk 4, objective lens 8 and image formation lens 6 are arranged substantially in the telecentric system. A height distribution of the sample 9 in the light axis direction can be converted to light intensity information in the first image formation optical system.

On the other hand, the confocal disk 4 and the CCD camera 12 are in a conjugate relationship by the lenses 10, 11, and further the second image formation optical system comprising the lenses 10, 11 and CCD camera 12 is disposed in the telecentric system on opposite sides by the presence of the aperture stop 18. The second image formation optical system may not be telecentric. However, if there is no problem with the length of the second image formation optical system, a telecentric system in which a peripheral light intensity does not easily drop is preferable.

The slice image only a plane in the vicinity of the focal point of the objective lens 8 is imaged by the CCD camera 12 through the first and second image formation optical systems. When the sectioning image is displayed on the monitor, only the focal point surface looks bright, and the portion deviating in the light axis direction from the focal point surface looks dark.

In this state, when the image formation lens 6 is moved along the light axis direction by the focal point moving apparatus 15, the image of the confocal disk 4 moves in the sample 9, and the focal point surface moves only by a predetermined distance. Therefore, while the focal point is moved, the sectioning images on the focal point surfaces of the samples 9 are obtained. Then, three-dimensional information of the sample 9 is obtained. At the same time the IZ peak position is estimated from the maximum luminance of the respective pixels of the plurality of sectioning images, and the height information of the sample 9 can be obtained. Additionally, the measurement range of XY is an imaging field of view in the CCD camera 12. The measurement range of Z is a range in which the focal point is moved by moving the image formation lens 6 along the light axis direction and the sectioning image is imaged.

According to the first embodiment of the present invention, when the image formation lens 6 of the first image formation optical system is moved along the light axis direction, the focal point position on the sample 9 is moved. Therefore, as described above, for example, assuming that the lateral magnification of the first image formation optical system is three times, when the image formation lens 6 is moved by 9 $\mu$m, the image of the confocal disk 4 is moved by 1 $\mu$m in the sample 9 surface, and the focal point surface can be moved by 1 $\mu$m. In a conventional method of moving the sample table or the objective lens, the movement amount corresponds to the movement amount of the focal point surface. However, in the method of moving the image formation lens 6 of the present invention, a movement precision can be set to 9 times. Therefore, the movement precision of the focal point can remarkably be enhanced. Additionally, for example, when the focal point surface is to be moved by 100 $\mu$m in the sample 9 surface, the movement amount of the image formation lens 6 is 900 $\mu$m, and a very realistic value can be obtained as the movement range.

Furthermore, for the movement of the image formation lens 6, different from the movement of large-sized and heavy components such as the conventional sample table and objective lens, the small-sized and lightweight component can be moved, it is therefore possible to control the vertical movement in the high speed, and a time for moving the focal point can largely be reduced.

As described above, according to the first embodiment of the present invention, the focal point can be moved with the high precision and in the high speed.

Figure 2:
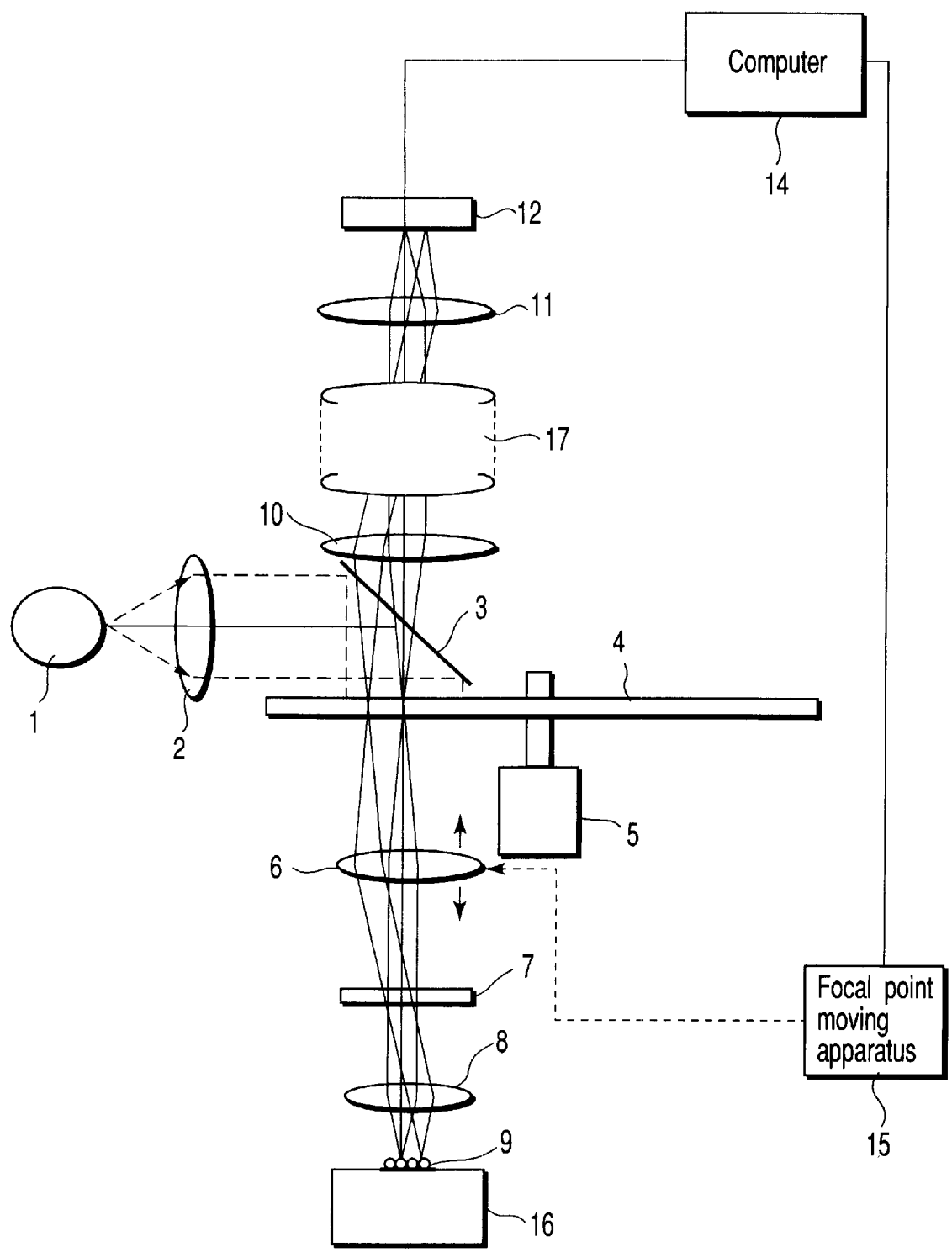
FIG. 2 is a diagram showing the schematic constitution of the confocal microscope according to a second embodiment of the present invention.

FIG. 2 is a diagram showing the schematic constitution of the confocal microscope according to a second embodiment of the present invention. In FIG. 2, the same part as that of FIG. 1 is denoted with the same reference numerals, and the detailed description thereof is omitted. Also in the second embodiment, the first and second image formation optical systems are disposed.

The second embodiment is different from the first embodiment in that the second image formation optical system includes a variable magnification optical system 17.

As the objective lens 8, in order to obtain the sectioning image having the broad field of view, a large NA and low magnification of 5 times or less (including one time or less, such as 0.5 time, 0.7 time) are used. The variable magnification optical system 17 can vary the image formation magnification onto the CCD camera 12, and is constituted, for example, of a zoom optical system or a turret variable magnification system in which a plurality of lens systems different in magnification can be changed. In the constitution, during the high-speed inspection by the broad field of view (high-speed scanning into the two-dimensional direction), the variable magnification optical system 17 is set to a low magnification. On the other hand, in the high-magnification enlargement/inspection of the defective portion by the narrow field of view, the variable magnification optical system 17 is set to the high magnification in order to perform the enlargement observation of the sectioning image formed on the confocal disk 4 by the first image formation optical system.

The high-speed inspection of the sample 9 is performed as follows. First, for the variable magnification optical system 17 of the second image formation optical system, the total magnification is changed to the low magnification of 0.5 times from 5 times.

In this state, similarly as the first embodiment, the light emitted from the light source 1 is incident upon the sample 9 via a collimate lens 2, PBS 3, confocal disk 4, image formation lens 6, ¼ wavelength plate 7, and objective lens 8. The reflected light from the sample 9 is imaged by the CCD camera 12 via the objective lens 8, ¼ wavelength plate 7, image formation lens 6, confocal disk 4, PBS 3, lens 10, low-magnification variable magnification optical system 17, and lens 11.

Similarly as the first embodiment, the sectioning image is obtained.

On the other hand, when the enlargement/inspection of some defective portions is required after the high-speed inspection, the variable magnification optical system 17 is set to the high magnification.

In this state, the light reflected from the sample 9 similarly as described above is projected as a sample image onto the confocal disk 4 by the image formation lens 6 via the low-magnification objective lens 8. The focused portion of the sample image projected on the confocal disk 4 is passed through the pinhole, and the sectioning image formed on the confocal disk 4 and having the broad field of view (low magnification) is imaged by the CCD camera 12 via the lens 10, high-magnification variable magnification optical system 17, and lens 11.

In this case, since the variable magnification optical system 17 is set to the high magnification, the sectioning image on the confocal disk 4 is enlarged by the variable magnification optical system 17 and imaged by the CCD camera 12. Therefore, since the sectioning image having the narrow field of view is obtained with the high magnification, the defective portion is enlarged with the high magnification and can be examined with the high precision.

Additionally, the sample image on the confocal disk 4 is already influenced by the sectioning effect in this state. Therefore, even when the variable magnification optical system 17 is disposed in the light path leading to the CCD camera 12 from the confocal disk 4, the effect is not deteriorated.

As described above, the variable magnification optical system 17 which can vary the image formation magnification onto the CCD camera 12 is disposed in the second image formation optical system. Therefore, while the sectioning effect is held, the magnification of the sample image obtained by the first image formation optical system and having the broad field of view can be varied to an optional magnification. For the variable magnification optical system 17, as compared with the conventional system requiring the replacement of the conventional objective lens and rotary disk, the constitution is simple and inexpensive. Furthermore, since the variable magnification optical system 17 is set to the low magnification during the high-speed inspection and to the high magnification during the enlargement/inspection of the defective portion, the high-speed broad range inspection and the enlargement/inspection of the defective portion can easily be performed.

As described above, according to the second embodiment of the present invention, while the sectioning effect is held, the varying of the magnification is also enabled, and the constitution is simple and inexpensive.

Figure 3:
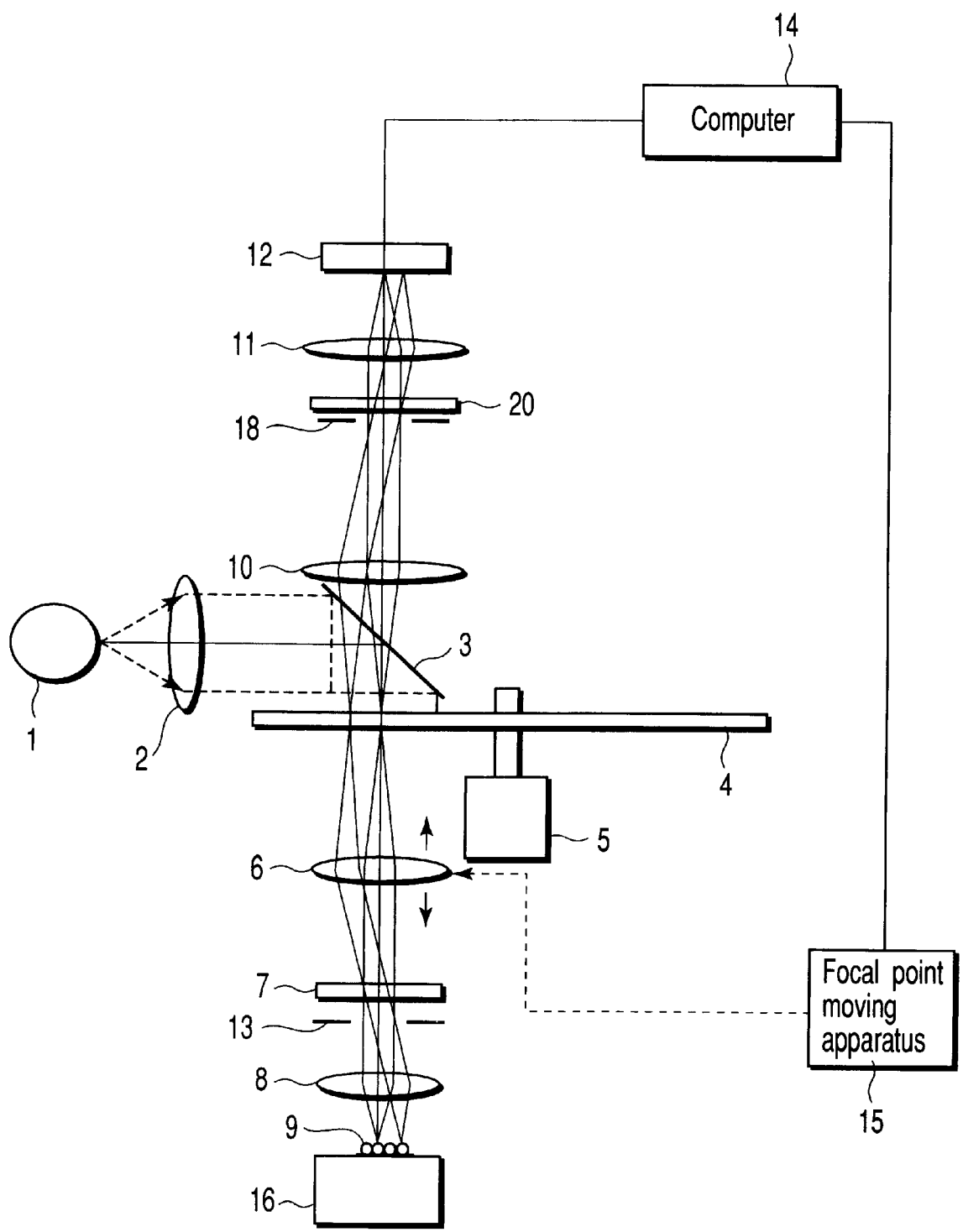
FIG. 3 is a diagram showing the schematic constitution of the confocal microscope according to a third embodiment of the present invention.

FIG. 3 is a diagram showing the schematic constitution of the confocal microscope according to a third embodiment of the present invention. In FIG. 3, the same part as that of FIG. 1 is denoted with the same reference numerals, and the detailed description thereof is omitted. In the third embodiment, the second image formation optical system includes a gradation optical system 20 described later in detail.

The image obtained by imaging the bump formed on the LSI chip of the sample 9 with the CCD camera 12 will be described with reference to FIGS. 4 to 6.

Figure 4:
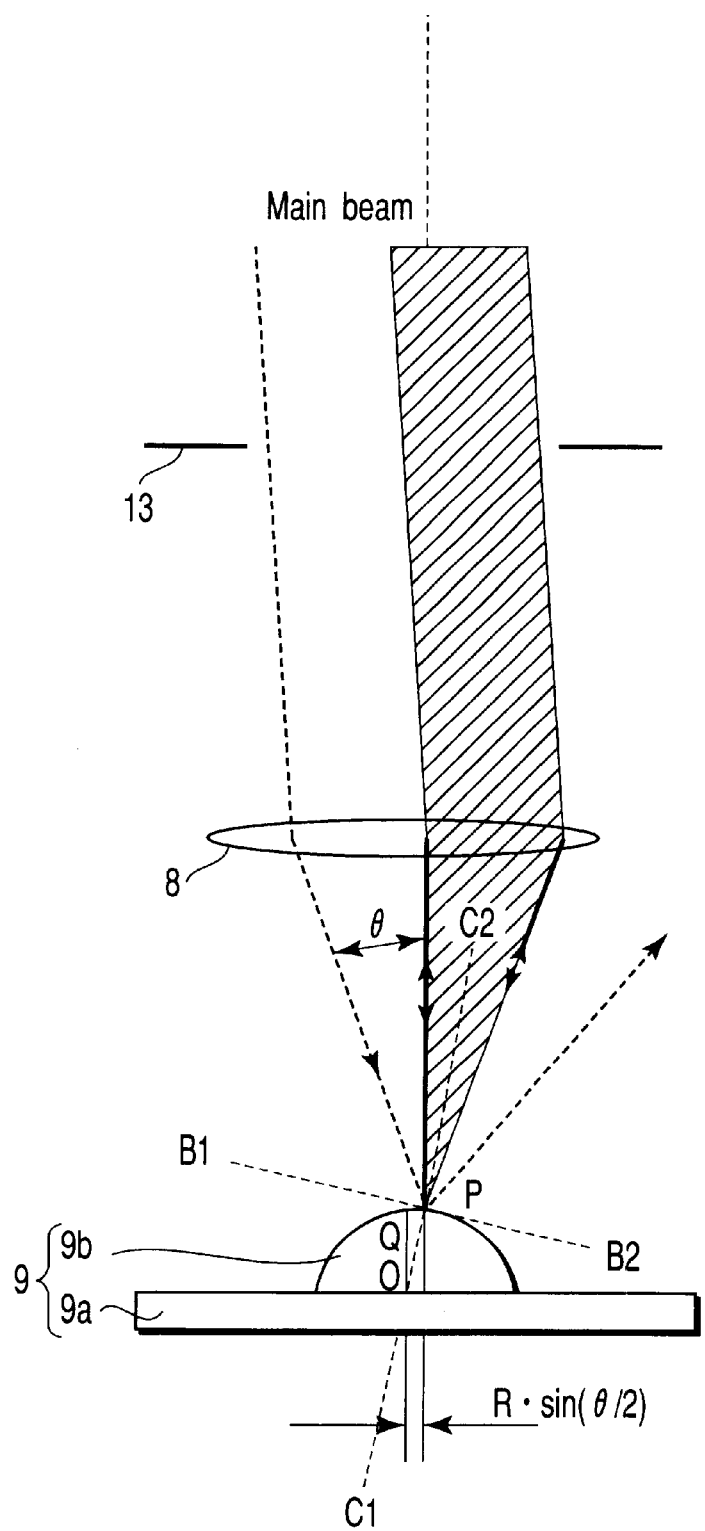
FIG. 4 is an explanatory view of a state of a reflected light in the vicinity of a bump vertex of the third embodiment.

FIG. 4 is an enlarged view of the sample 9 to the aperture stop 13 of FIG. 3. For the sake of simplicity, FIG. 4 shows that only one bump 9b is formed on an LSI chip 9a in the sample 9 below the objective lens 8. A light flux transmitted through the aperture stop 13 indicates a light flux passed through one pinhole of the confocal disk 4.

Additionally, in actual, a plurality of light fluxes from a plurality of pinholes are passed through the aperture stop 13.

In this constitution, the light flux passed through the aperture stop 13 is passed through the objective lens 8, and focused in a point P in the vicinity of the vertex of the bump 9b. In this case, since the bump 9b forms a semispherical shape, and the periphery has a spherical surface, a part of the light reflected by the point P is kicked by an outer portion of the objective lens 8 and cannot be incident again. Additionally, as the point P leaves the vertex, a ratio of the reflected light incident again upon the objective lens 8 decreases.

Conditions for reflecting a principal ray passed through the center of the aperture stop 13 by the point P of the bump 9b, and allowing the principal ray reflected by the point P to be incident upon the objective lens 8 again are obtained. In this case, the numerical aperture (NA) of the objective lens 8 is $\theta$ to NA=sin $\theta$ in FIG. 4. Assuming that the bump 9b has a completely spherical surface, a tangent of the bump 9b in the point P is B1–B2, and a normal to the tangent B1–B2 in the point P is C1–C2.

As apparent from FIG. 4, to reflect the principal ray by the point P and allow the principal ray to be incident upon the objective lens 8 again, an angle formed between the principal ray upon the objective lens 8 and the line C1–C2 needs to be $\theta/2$ or less. Therefore, when the angle formed between the principal ray and C1–C2 is $\theta/2$, and the bump 9b has a radius R, a position of the point P in the X direction (lateral direction in the drawing) from the center of the bump 9b is R·sin($\theta/2$). Therefore, a whole width range of the point P at which the principal ray can be incident upon the objective lens 8 again is 2R·sin($\theta/2$). When the point P is apart from the center of the bump 9b, the reflected light incident again upon the objective lens 8 rapidly decreases.

Figure 5A:
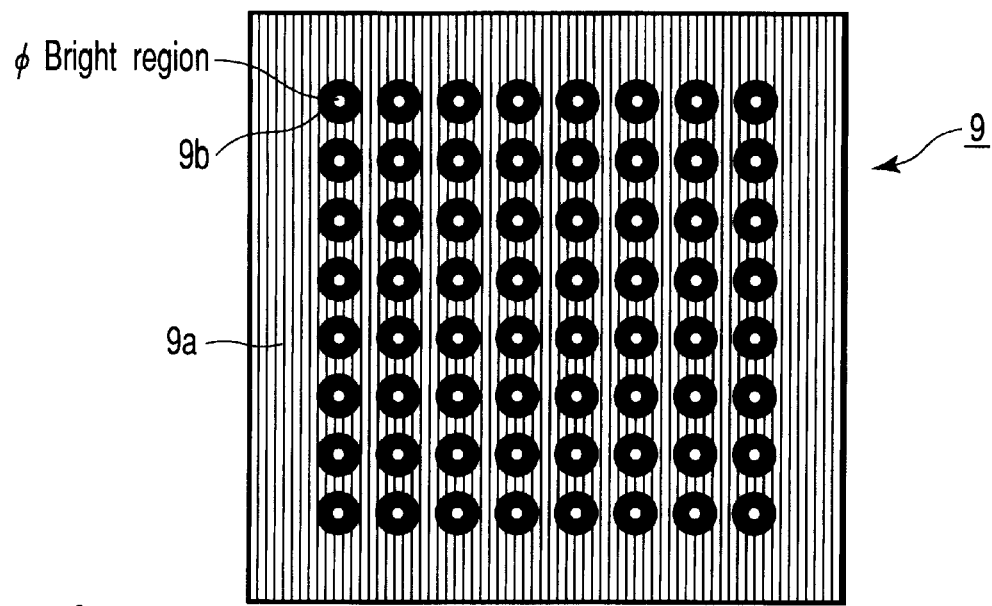
FIGS. 5A and 5B are diagrams showing a confocal image according to the third embodiment.

An observation state of a large number of bumps formed on the LSI chip will be described. FIG. 5A shows a confocal image in a case in which the vicinity of the vertex of the bump 9b on the LSI chip 9a is focused. Assuming that a void region looking bright in the center of the bump 9b shown in FIG. 5A is $\phi$, $\phi$=2R·sin($\theta/2$) results. A portion actually apart from 2R·sin($\theta/2$) rapidly looks dark. For example, assuming that the objective lens 8 has a numerical aperture NA 0.3 and the bump 9b has a radius R=20 $\mu$m, $\phi$=6 $\mu$m. With the pitch of the bump 9b of 50 $\mu$m, regions which look bright $\phi$=6 $\mu$m seem to be arranged at a pitch of 50 $\mu$m. By the above-described sectioning effect of the confocal optical system, only a sectioning image of about several micrometers can be observed in the Z direction from the vertex of the bump 9b. Therefore, the reflected light from the LSI chip 9a surface disposed several tens of micrometers from the vertex of the bump 9b is not detected, and a bright image can be observed only in the vicinity of the vertex of the bump 9b. Additionally, in FIG. 5A, the LSI chip 9a surface and the blackened portion of the bump 9b are shown as if they had different densities, but this is only for description. In actual, only the vicinity of the vertex of the bump 9b looks bright, and other portions are substantially black.

When the focused position is brought close to the LSI chip 9a surface from this state in FIG. 4, the vicinity of the vertex of the bump 9b gradually becomes dark by the sectioning effect of the confocal optical system. When the focused position is further brought close to the LSI chip 9a surface, the bump 9b is darkened. When the focused position is further brought close to the LSI chip 9a surface, the LSI chip 9a surface gradually looks bright. When the LSI chip 9a surface is focused, as shown in FIG. 5B, the bump 9a substantially turns black, and the LSI chip 9a surface looks brightest.

Figure 5B:
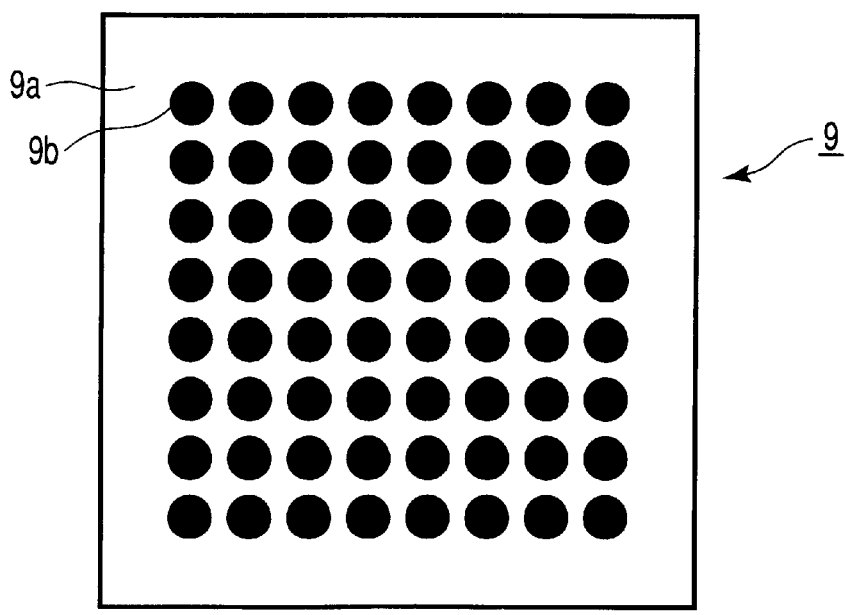

In actual, the images shown in FIGS. 5A and 5B are imaged by the CCD camera 12. Therefore, the imaging will be considered. A pixel size of CCD for use in the CCD camera 12 is usually in a range of several micrometers to about 10 $\mu$m. However, for the sake of simplicity, a 10 $\mu$m square pixel is assumed. For 1000×1000 (one million pixels) which have been easily obtained in recent years, a CCD size is 10×10 mm. FIG. 6A shows a relation between the CCD and the image of FIG. 5A in a case in which the image of FIG. 5A is formed (an actual field of view of 10×10 mm as a broad field of view) on the CCD having this size with a magnification of one time in the optical system. Here, a reason why the optical system magnification is assumed to be one time is that the optical system having a broad field of view is to be realized and high-speed inspection be realized. In practical use, the total magnification is set to five to two times in some case, or to a reduction system such as 0.5 times, 0.7 times in the other case.

Additionally, excluding some special CCD cameras, the CCD cameras able to be usually available are called interline type, and are constituted of light receiving portions 12a and signal transfer portions 12b. In this case, the 10 $\mu$m square pixel has a pitch of 10 µm, each light receiving portion 12a is not 10 µm square, and each signal transfer portion 12b cannot detect the light. In the CCD the region φ=6 µm in which the vertex of the bump 9b looks bright is formed into the image as a light spot a. Then, the light spot a is incident upon the light receiving portion 12a as shown in region A of FIG. 6A in some case, and deviates from the light receiving portion 12a as shown in region B in the other case. In the case, when the light spot a deviates from the light receiving portion 12a as shown in the region B, the CCD camera 12 cannot detect anything.

To eliminate this, a size of about one pixel is required such that the light spot a is incident upon the light receiving portion 12a. Unless the pitch of the bump 9b is accurately integer times the pitch of the CCD pixel, the light spot a cannot be detected, and a moire image is generated. Therefore, to detect the light spot a with the CCD camera 12 of the interline type, the size of the light spot a may be enlarged with respect to the light receiving portion 12a. However, when the light spot is simply enlarged, the actual field of view is narrowed, a scanning time increases, and requirements of the high-speed inspection are not satisfied.

Additionally, the bumps 9b have a known minimum pitch, and are regularly arranged to some degree. As apparent from FIG. 6A, when the vicinity of the vertex of the bump 9b is focused and the confocal image is imaged by the CCD camera 12, the image of the vertex of the bump 9b is discrete, and a most part of the CCD pixels is a portion having received no light. Therefore, in FIG. 6A, when only the light spot a can be enlarged without changing an interval between the light spots a disposed adjacent to each other, all the light spots a can be detected without increasing the total magnification of the optical system, that is, without narrowing the actual field of view. This state is shown in FIG. 6B. In this manner, light spot gradation means for generating a gradated image a' in which only the light spot a is enlarged without raising a so-called optical magnification is called herein a gradation optical system. Additionally, in FIG. 6B, the light spot a is enlarged in a two-dimensional direction in the plane. However, only to detect the light spot a, the enlargement direction of the light spot a may be an optional one-dimensional direction.

Figure 7A:
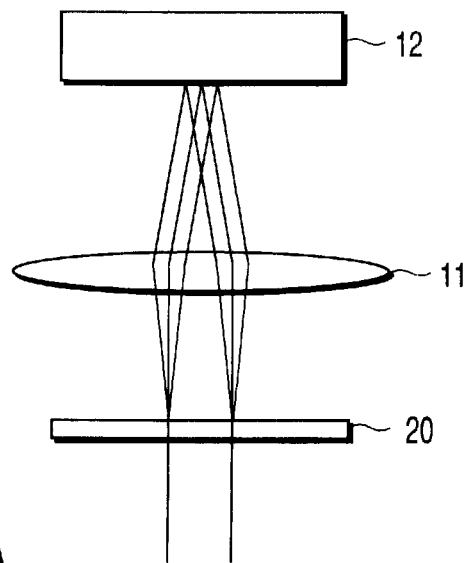
FIGS. 7A and 7B are explanatory views of a gradation optical system for use in the third embodiment.
Figure 7B:
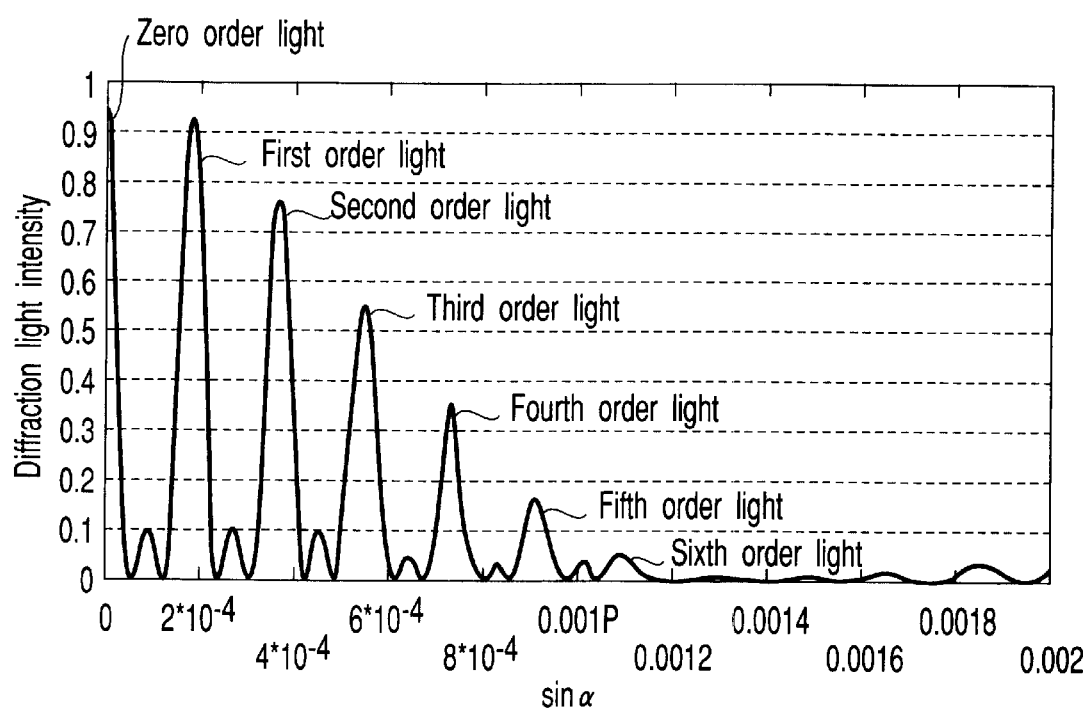

Various gradation optical systems are considered. Here, for the gradation optical system 20, a weak diffusion plate or a diffraction lattice is preferably disposed in the vicinity of the aperture stop 18 in the focal point position after the lens 11. FIG. 7A shows that only light beams with respect to the gradation optical system 20, lens 11 and CCD camera 12 are extracted and the light is diffused or diffracted by the gradation optical system 20. To calculate a spread amount of the light spot a by the gradation optical system 20, it is now assumed that the image formation lens 6 and lens 10 have the same focal point distance, and the image is formed with one time as the total magnification of the sample 9 to the CCD camera 12. It is assumed that the objective lens 8 and lens 11 have the same focal point distance, and the objective lens 8 and lens 11 have the focal point distance, for example, of 20 mm. Here, with the weak diffusion plate, the diffusion angle total width is set to 0.1 degree. Since the weak diffusion plate is in the focal point position after the lens 11, 2·sin(0.05°)·20 mm=35 µm results on the CCD camera 12. This is a state in which the light spot a is enlarged to substantially the same size as that of the gradated image of the bump vertex shown in FIG. 6B. On the other hand, with the use of the diffraction lattice, assuming that a wavelength of light λ is 0.55 µm, the pitch P of the diffraction lattice is 3 mm, and the transmission slit width is 0.4 mm, as shown in FIG. 7B, as a diffraction angle α, a relation of sinα on the abscissa and a diffraction light intensity of each dimension number on the ordinate is calculated. FIG. 7B shows only one-sided diffraction angle. In FIG. 7B, when the diffraction light intensity of a 0-dimensional light is 1, the diffraction light intensity is 0.1 or less with sinα=about 0.0011. Therefore, the diffraction lights up to ±6 dimensions may substantially be considered. Similarly as the above-described weak diffusion plate, the interval on the ±6-dimensional CCD camera 12 is 2·0.0011·20 mm=44 µm, and 13 light spots of −6-dimensional light to +6-dimensional light are generated in a width of 44 µm.

Additionally, the diffraction intensities shown in FIG. 7B is calculated according to the principle of Max&Born optics, and calculated in the following equation.

$$I(\sin\alpha) = [(\sin((N \times k \times d \times \sin\alpha)/2)/N \times \sin(k \times d \times \sin\alpha)/2)^2] \times$$
$$[(\sin((k \times s \times \sin\alpha)/2)/(k \times s \times \sin\alpha)/2]$$

Additionally,
k=2×π/λ, s: slit, d: lattice pitch, N: the number of lattices in the light flux.

As a result, with the diffraction lattice, different from the diffusion plate, the light spots are discontinuously generated as apparent from FIG. 7B.

The gradation optical system 20 such as the diffusion plate and diffraction lattice can be attached to/detached from the second image formation optical system, so that the light spot a is to be enlarged or is not to be enlarged. Therefore, for example, when the apparatus is adjusted, the gradation optical system 20 is removed and an adjustment operation can easily be performed when the diffusion plate or the diffraction lattice is replaceable, the degree of enlargement of the light spot can be changed if necessary. This has an effect that a required gradation degree of the light spot a can be selected in accordance with the pitch of the bump 9b as the sample 9.

When the light intensity of the gradated image in the vicinity of the vertex of the bump 9b shown in FIG. 6b and obtained using the gradation optical system 20 is integrated, the light intensity changes based on I-Z characteristics. Therefore, when the sample stage 16 is driven by the focal point moving apparatus 15 of FIG. 3, and the focal point is moved, the focal point position corresponding to the maximum value of the integrated light intensity is obtained from the relation between the focal point movement amount and the integrated light intensity of the light spot a. Thereby, the height of the bump 9b can precisely be measured. In this system, since the light spot a is enlarged, the energy density of the light spot a drops. But the brighter light source may be used. Rather, the light intensity change of one light spot a is detected with the integrated light intensity of the plurality of pixels. Therefore, when the bright light source is used, the signal having a satisfactory S/N can be obtained.

It is more accurate to consider the height of the bump 9b obtained in this manner as the average height of the regions looking bright in FIG. 5A than as the height of the bump vertex. Substantially, it may be considered to measure the height of the bump vertex. The reason is as follows. The diameter φ of the region which looks bright in FIG. 5A is φ=6 µm, assuming that the bump radius R=20 µm, and objective lens NA (sin θ)=0.3. The center of the region which looks bright is point Q in FIG. 4, and a difference ΔZb of the height of the point Q and the height of φ6 µm opposite ends is 0.23 µm at most from ΔZb=(1−cos(θ/2))×R=0.23 µm. Therefore, when the bump height is measured with a precision of several micrometers, and even when the average bump height between points Q and P is obtained, it may substantially be considered that the height of the bump vertex is measured.

In this manner, the confocal optical systems constituted of the second image formation optical system including the gradation optical system 20 and the first image formation optical system are arranged in series, and one light spot a is spread over the plurality of pixels on the CCD camera 12 by the gradation optical system 20 of the second image formation optical system. In this state, the height information of the sample 9 is taken in as the light intensity information as the sectioning effect of the confocal optical system. Therefore, even when the CCD camera 12 having the usual number of pixels is used, the sample height can be measured at once in the broad range without narrowing the actual field of view, and this can realize the height measurement in the high speed.

One light spot a is spread over the plurality of pixels on the CCD camera 12 by the gradation optical system 20 of the second image formation optical system. Thereby, the moire is not generated by the pitch of the bump and the CCD pixel pitch. Furthermore, the light quantity is distributed to the plurality of pixels on average. Therefore, during the photography by the CCD camera 12, the light source is set to be bright to such an extent that the respective pixels are not saturated. Then, the integrated light intensity of these plurality of pixels can be enlarged, this is very advantageous in S/N, and the high-precision height measurement can be performed with respect to the miniaturized bump.

On the other hand, examples of the CCD include a special CCD (frame transfer type) having an aperture ratio (ratio of the light receiving portions for one pixel) of 100%, and this CCD can necessarily detect any small light spot. When the above-described gradation optical system is applied to detect the integrated light intensity of the plurality of pixels, the S/N can further be improved.

Figure 8:
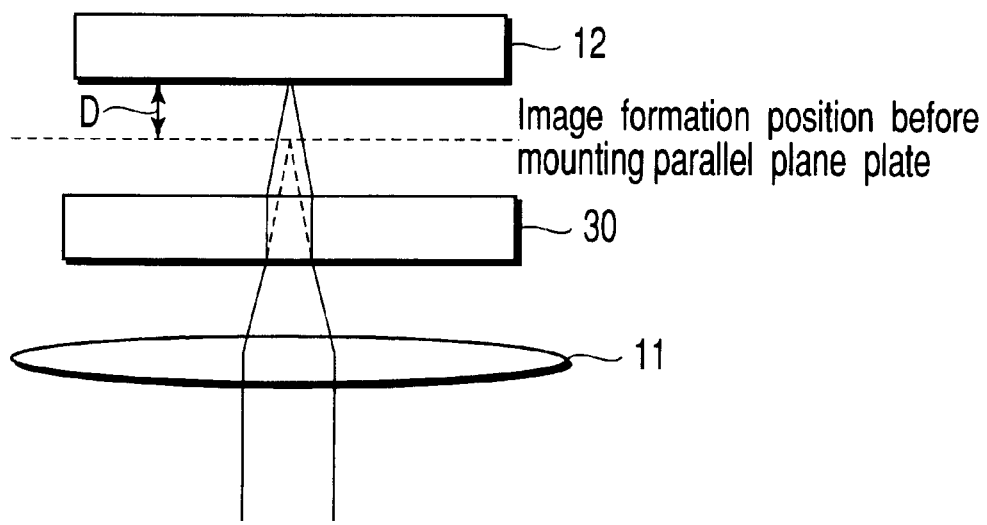
FIG. 8 is an explanatory view of a first modification example of the gradation optical system for use in the third embodiment.

For example, a parallel plane plate glass can also be used as the gradation optical system. In FIG. 8, a parallel plane plate glass 30 is attachably/detachably disposed as the gradation optical system between the lens 11 and the CCD camera 12.

In this case, since the light is focused between the lens 11 and the CCD camera 12, the light is refracted by the parallel plane plate glass 30, a close axis image formation position deviates by D, and therefore the imaging surface of the CCD camera 12 deviates by D. Additionally, when the parallel plane plate glass 30 is present midway in the focused light, aberration is generated, and the light spot a is enlarged on the CCD camera 12. In this case, it can be interpreted that with the thicker parallel plane plate glass 30 and a larger emission NA from the lens, the light spot becomes larger and spherical aberration is generated. In this manner, it is possible to enlarge only the light spot a by the parallel plane plate glass 30. For example, assuming that the lens 11 has an emission numerical aperture of 0.3, in order to enlarge the light spot in the state shown in FIG. 6B, an optimum glass thickness is around 10 mm as apparent from a light beam tracking simulation. FIG. 9 shows four types of thickness of the parallel plane plate glass 20: t=0 mm (without glass), 5 mm, 10 mm, 15 mm. A spot diagram in a position in which the focused spot is minimized is shown. It is seen that the light is not easily focused on one point with a thicker plate.

Additionally, in order to generate the aberration and enlarge the light spot, the second image formation optical system may have the aberration. However, the parallel plane plate glass 30 can be inserted/detached with respect to the second image formation optical system, and can handle either case in which the aberration is to be generated or not to be generated the parallel plane plate glass 30 may be disposed anywhere in the light path of the focused light in the second image formation optical system, and can also be disposed, for example, between the PBS 3 and the lens 10 to be attachable/detachable.

Figure 10:
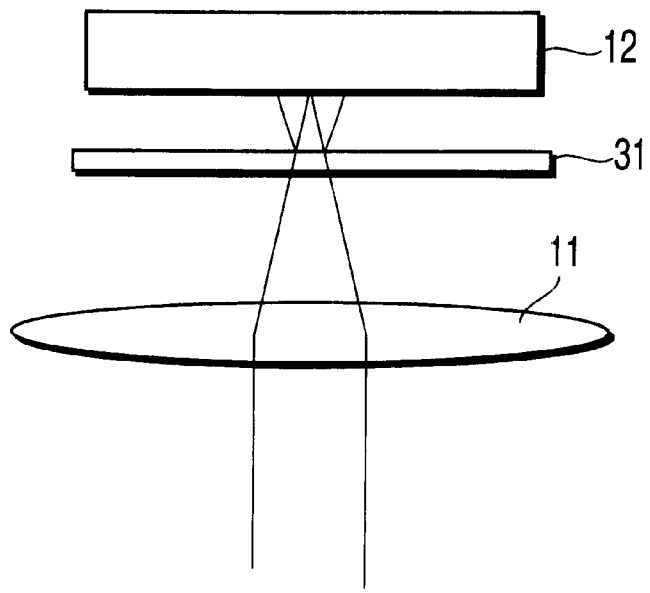
FIG. 10 is an explanatory view of a second modification example of the gradation optical system for use in the third embodiment.

As shown in FIG. 10, as the gradation optical system, a gradation optical device 31 such as the diffusion plate and diffraction lattice can also attachably/detachably be disposed immediately before the CCD camera 12. In this case, the diffusion plate or the diffraction lattice as the gradation optical device 31 is disposed in a position slightly deviating from the image formation position of the lens 11. Thereby, while the light spot is not completely focused, the light is incident upon the gradation optical device 31, and the incidence light is diffused or diffracted by the device, and enlarged and incident upon the CCD camera 12. Thereby, for the image in the state of FIG. 6A, the light spot a can be enlarged in the state of FIG. 6B. Additionally, the gradation optical device 31 such as the diffusion plate and diffraction lattice is disposed in the image formation position of the lens 11, and the CCD camera 12 may be disposed in a position slightly deviating the image formation position.

In the above, a method of disposing the gradation optical system on the front surface of the CCD camera 12, and generating gradation has been described. However, the gradation can also be generated by changing a relative position relation in the light axis direction between the second image formation optical system and the CCD camera 12. In this case, when the CCD camera 12 is disposed in the image formation position of the second image formation optical system, a gradation amount is zero. When the camera deviates from the image formation position, the gradation amount can optionally be changed. According to the method, the moving mechanism for moving the CCD camera 12 in the light axis direction is used without using the gradation optical system for generating the gradation, so that the gradation amount can continuously be varied.

According to the third direction of the present invention, while one light spot is spread over the plurality of light receiving portions of imaging means by the light spot gradation means, the height information of the measurement object is taken in as the light intensity information by the sectioning effect of the confocal microscope. Therefore, even when the CCD camera having the usual number of pixels is used as the imaging means, the sample height measurement can be performed at once in a broad range without narrowing the actual field of view, and the high-speed height measurement can be realized.

The light source is set to be bright to such an extent that the light receiving portion is not saturated in the imaging means. Then, the integrated light intensity in the plurality of light receiving portions can be enlarged, and this is advantageous in S/N.

Furthermore, priority of the inspection precision and inspection time can be changed in accordance with the purpose of the inspection, and one apparatus can achieve various inspection purposes.

Additionally, in each confocal optical system, the CCD camera 12 obtains a plurality of slice images discrete in the Z direction. In this case, needless to say, the height can be measured with a good precision, when the slice images have a fine interval in the Z direction. When the slice images have a coarse interval of the Z direction, the high-speed inspection is more advantageously realized. In this manner the height inspection precision and the inspection time are inevitably in a tradeoff relation. However, when the priority of the inspection precision and inspection time can be changed in accordance with the purpose of the inspection, one apparatus can achieve various inspection purposes. That is, for the apparatuses described above in the respective embodiments, the focal point moving apparatus 15 moves the focus position on the sample 9. Therefore, in an inspection precision priority mode, the sampling interval of the slice images in the Z direction is set to be fine. In an inspection time priority mode, the sampling of the Z direction may be set to be coarse. To further raise the speed in the inspection time priority mode, the sampling interval of the Z direction is set to be coarser, the obtained slice images are reduced, and an interpolation processing is performed from the relation (I-Z characteristics) of the integrated light intensity of the enlarged light spot on the obtained slice image and Z so that the high-speed inspection may also be performed. Furthermore, when the speed is further raised, it is also possible to start the sampling of the Z direction before and after an allowable range of the Z direction as a standard of height appropriateness judgment set for each type of the sample 9.

According to the third embodiment of the present invention, the high-precision height measurement can be performed even with respect to the miniaturized sample in a short time.

The present invention relates to a confocal microscope in which a confocal disk is used to obtain the sectioning image and a height measurement method using the microscope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A confocal microscope which uses a confocal disk, comprising:
    a light source;
    a high-NA and low-magnification objective lens which forms an image of said confocal disk obtained by irradiation with a light from the light source on a sample;
    a first image formation lens system disposed between said confocal disk and said objective lens;
    first image formation lens driving means for moving said first image formation lens system in a light axis direction and adjusting a focal point position of said objective lens with respect to said sample; and
    a second image formation lens system which forms a sectioning image formed on said confocal disk into an image by photoelectric conversion.

2. The confocal microscope according to claim 1, wherein a magnification of said objective lens is a low magnification of about 10 times.

3. The confocal microscope according to claim 1, wherein a magnification of said objective lens is a low magnification of 0.5 time to 5 times.

4. The confocal microscope according to claim 1, wherein said second image forming optical system includes a variable magnification optical system which forms the sectioning image on said confocal disk with respect to said photoelectric conversion with a varied image forming magnification.

5. The confocal microscope according to claim 4, wherein said variable magnification optical system comprises a zoom lens which can vary magnification between a high magnification and a low magnification.

6. The confocal microscope according to claim 4, wherein said variable magnification optical system comprises a turret in which a plurality of lenses different in magnification are replaceable.

7. The confocal microscope according to claim 1, wherein said first image forming optical system and said objective lens are in a telecentric arrangement.

8. The confocal microscope according to claim 1, wherein said second image forming lens system has a telecentric arrangement with respect to said confocal disk and opposite sides of photoelectric conversion means for performing said photoelectric conversion.

9. The confocal microscope according to claim 1, wherein said first image formation lens driving means moves a focal point of said first image formation lens system in the light axis direction by a driving command from a computer, and the computer takes in the sectioning image on said confocal disk in each movement position by said photoelectric conversion and obtains three-dimensional information.

10. A height measurement method in a confocal microscope which uses a confocal disk,
    said microscope comprising: a light source; a high-NA and low-magnification objective lens which forms an irradiation light from the light source into an image on a sample through said confocal disk; a first image formation lens system disposed between said confocal disk and said high-NA and low-magnification objective lens; first image formation lens driving means for moving said first image formation lens system in a light axis direction and adjusting a focal point position of said objective lens with respect to said sample; and a second image formation lens system which forms a sectioning image formed on said confocal disk into an image in a CCD camera,
    said measurement method comprising: moving said first image formation lens system in the light axis direction by said first image formation lens driving means; processing luminance information of pixels of sectioning images in a plurality of positions, formed by said CCD camera; and obtaining height information of said sample.

11. The height measurement method according to claim 10, wherein said second image formation lens system further includes light spot gradation means for enlarging a light spot formed into the image by said CCD camera such that the light spot extends over a plurality of pixels of the CCD camera disposed adjacent to one another, and
    said method further comprises: processing integrated luminance value information of light intensities received by the plurality of pixels which receive the light spots enlarged by the gradation means.

12. The height measurement method according to claim 10, wherein said gradation means comprises one of a diffusion plate and a diffraction lattice which changes a size of the light spot without changing an optical magnification, and which can be disposed to be attachable/detachable with respect to said second image formation lens.

* * * * *